US007047694B2

(12) United States Patent
Salzman

(10) Patent No.: US 7,047,694 B2
(45) **Date of Patent: *May 23, 2006**

(54) DOOR SAFETY GUARD

(76) Inventor: Allan J. Salzman, 56 Williams Rd., Sharon, MA (US) 20267

( * ) Notice: Subject to any disclaimer, the term of this patent is extended or adjusted under 35 U.S.C. 154(b) by 0 days.

This patent is subject to a terminal disclaimer.

(21) Appl. No.: 10/939,083

(22) Filed: Sep. 10, 2004

(65) Prior Publication Data

US 2005/0028447 A1 Feb. 10, 2005

Related U.S. Application Data

(63) Continuation of application No. 10/232,064, filed on Aug. 30, 2002, now Pat. No. 6,804,914.

(51) Int. Cl.
*B60J 5/00* (2006.01)

(52) U.S. Cl. .......................................................... 49/462

(58) Field of Classification Search .................. 49/383, 49/460, 462; 16/250, 251, 252–254, 270, 16/355; 160/40
See application file for complete search history.

(56) References Cited

U.S. PATENT DOCUMENTS

| | | | | | |
|---|---|---|---|---|---|
| 1,811,718 | A | * | 6/1931 | Hofbauer | 190/28 |
| 2,694,234 | A | * | 11/1954 | Roby et al. | 49/383 |
| 2,910,741 | A | * | 11/1959 | Dettman | 49/383 |
| 3,302,690 | A | * | 2/1967 | Hurd | 160/40 |
| 3,319,697 | A | * | 5/1967 | Krohn | 160/229.1 |
| 4,804,223 | A | * | 2/1989 | Iati | 296/152 |
| 4,878,267 | A | * | 11/1989 | Roach et al. | 16/250 |
| 4,941,524 | A | * | 7/1990 | Greer | 160/67 |
| 5,001,862 | A | * | 3/1991 | Albenda | 49/383 |
| 5,199,478 | A | * | 4/1993 | Kubota | 160/40 |
| 5,419,084 | A | * | 5/1995 | Sankey et al. | 49/383 |
| 5,544,456 | A | * | 8/1996 | Dries | 52/204.1 |
| 5,680,675 | A | * | 10/1997 | Davis | 16/83 |
| 5,765,311 | A | * | 6/1998 | Kapler | 49/383 |
| 5,782,282 | A | * | 7/1998 | Chen | 160/206 |
| 5,799,443 | A | * | 9/1998 | Koeniguer | 49/383 |
| 6,088,966 | A | * | 7/2000 | Kenkel | 49/383 |
| 6,141,909 | A | * | 11/2000 | Hanson | 49/303 |
| 6,434,888 | B1 | * | 8/2002 | Shaw et al. | 49/383 |

FOREIGN PATENT DOCUMENTS

| | | |
|---|---|---|
| GB | 2292964 | 3/1996 |
| GB | 2306538 | 5/1997 |
| GB | 2314112 | 12/1997 |

OTHER PUBLICATIONS

Kapler, www.fingerguard.com, pp. 1, 1-2, 1, 1-2, 1, 1-2, and 1-2, Aug. 28, 2002.
Fingersafe.RTM. USA, www.fingersafe.com, pp. 1-2, 1-2, 1, 1-2, 1-3, and 1-2.

* cited by examiner

*Primary Examiner*—Jennifer E. Novosad
(74) *Attorney, Agent, or Firm*—Bromberg & Sunstein LLP

(57) ABSTRACT

A door safety guard utilizes two interconnected elongated members, one positioned on each side of a door and resting along a length of the door surface and the adjacent frame. Elastic bands are used to interconnect the two elongated members. Hinges may be used to secure the elastic bands to the elongated members.

14 Claims, 9 Drawing Sheets

320

340

310

330

DOOR SAFETY GUARD

PRIORITY

This application is a continuation of U.S. patent application Ser. No. 10/232,064, which was filed on Aug. 30, 2002, now U.S. Pat. No. 6,804,914 and is hereby incorporated herein by reference in its entirety.

FIELD OF THE INVENTION

The present invention relates generally to a door safety guard, and more particularly to a door safety guard that prevents a finger or other object from being inserted into the gaps formed along the hinged edges of an open door and from being pinched or crushed as the door is closed.

BACKGROUND

As is commonly known, a door can be attached to a frame using a number of hinges such that the door pivots relative to the frame via the hinges. When the door is in an open position, gaps are typically formed between the door and the frame on both sides of the hinged edge of the door. The gap on the side of the door accessible to the hinges is typically smaller than the gap on the other side of the door, although fingers and other objects can fit into either gap and can be pinched or crushed when the door is closed.

Many attempts have been made to reduce the risk posed by doors, especially for children who are apt to get their fingers caught in doors.

U.S. Pat. No. 5,765,311 (Kapler) describes various prior art door guards, and also describes a door guard comprising an elongated member having two edges, one of which is pivotally attached to the door frame, and the other of which is free-standing and rests against the surface of the door. The guard is biased toward the door so that the guard moves with the door as it opens and closes. An embodiment of this door guard is described on the web site of Mountain View Enterprise, RR1 Box 1022, Lopez, Pa. 18628 (fingerguard-.com).

Another prior art door guard is described on the web site of fingersafe USA, Inc., 115 West Oglethorpe Avenue, P.O. Box 8777, Savannah, Ga. 31412 (fingersafe.com).

SUMMARY OF THE INVENTION

A door safety guard utilizes two interconnected elongated members, one positioned on each side of a door and resting along a length of the door surface and the adjacent frame. Elastic bands are used to interconnect the two elongated members. Dowels or pins (referred to hereinafter as hinges) may be used to secure the elastic bands to the elongated members. Because the two elongated members are interconnected, the door safety guard is easy to install without requiring attachment to either the door or the door frame, and therefore is also easy to remove without unduly damaging the door or the door frame. This is in contrast to prior art door safety guards that are fastened to the door and/or the door frame, for example, using screws or adhesives.

In one embodiment of the invention there is provided a door safety guard comprising an elongated member having two lateral portions for respectively contacting a door surface and an adjacent door frame, the elongated member capable of being interconnected with another elongated member such that one elongated member is positioned on each side of the door and rests along a length of the door surface and the adjacent door frame so as to substantially cover the gaps formed between the door and the adjacent door frame when the door is in an opened position and prevent a finger or other object from being pinched or crushed when the door is closed. The elongated member is typically comprised of a unitary rigid piece of material, such as a plastic material, a metal material, a fiberglass material, a composite material, or a wood material, and is preferably fabricated using an extrusion process. The elongated member typically includes a channel portion for holding a hinge apparatus as part of the interconnection between the two elongated members.

In another embodiment of the present invention there is provided a door safety guard comprising two elongated members, each having two lateral portions for respectively contacting a door surface and an adjacent door frame, the two elongated members capable of being interconnected such that an elongated member is positioned on each side of the door and rests along a length of the door surface and the adjacent door frame so as to substantially cover the gaps formed between the door and the adjacent door frame when the door is in an opened position and prevent a finger or other object from being pinched or crushed when the door is closed. Each elongated member is typically comprised of a unitary rigid piece of material, such as a plastic material, a metal material, a fiberglass material, a composite material, or a wood material, and is preferably fabricated using an extrusion process. The door safety guard typically includes a number of connectors capable of interconnecting the two elongated members such that an elongated member is positioned on each side of the door and rests along a length of the door surface and the adjacent door frame so as to substantially cover the gaps formed between the door and the adjacent door frame when the door is in an opened position and prevent a finger or other object from being pinched or crushed when the door is closed. The connectors typically include elastic bands, and each elongated member includes means for securing the elastic bands. Hinges may be used to secure the elastic bands to the elongated members, in which case each elongated member includes a channel portion into which the hinges fit securely. The hinge typically includes a recessed portion for seating an elastic band.

In another embodiment of the invention there is provided a method for covering the gaps formed between a door and an adjacent door frame in order to prevent a finger or other object from being inserted into the gaps and from being pinched or crushed as the door is closed. The method involves positioning an elongated member on each side of the door and interconnecting the two elongated members such that each elongated member rests along a length of the door surface and the adjacent door frame so as to substantially cover the gaps formed between the door and the adjacent door frame when the door is in an opened position and prevent a finger or other object from being pinched or crushed when the door is closed. Interconnecting the two elongated members typically involves attaching a number of elastic bands between the two elongated members through the gaps formed between the door and the adjacent door frame. Attaching an elastic band between the two elongated members typically involves coupling the elastic band to one of the elongated members, passing the elastic band through the gaps formed between the door and the adjacent door frame, and coupling the elastic band to the other elongated member. The processes of coupling an elastic band to an elongated member typically involve wrapping the elastic band around a hinge and inserting the hinge into a channel formed in the elongated member.

In another embodiment of the invention there is provided an apparatus for attaching an elastic band to an elongated member of a door safety guard. The apparatus includes a perimeter sized to fit securely within a channel portion of the elongated member and a recessed portion in said perimeter for seating an elastic band.

BRIEF DESCRIPTION OF THE DRAWINGS

In the accompanying drawings:

FIGS. 1A–1D show various views of an exemplary elongated member in accordance with an embodiment of the present invention, wherein FIG. 1A shows a front view of the elongated member, FIG. 1B shows a side view of the elongated member, FIG. 1C shows a top view of the elongated member, FIG. 1D shows a front perspective view of the elongated member;

FIGS. 2A–2C show various views of an exemplary hinge in accordance with an embodiment of the present invention, wherein FIG. 2A shows a top view of the hinge, FIG. 2B shows a side view of the hinge, and FIG. 2C shows a perspective view of the hinge;

FIGS. 3A–3D show various views of an exemplary end cap in accordance with an embodiment of the present invention, wherein FIG. 3A shows a top view of the end cap, FIG. 3B shows a front view of the end cap, FIG. 3C shows a side view of the end cap, and FIG. 3D shows a front perspective view of the end cap;

FIGS. 8A–8C show various views of the installed door safety guard structures with the door in different positions, wherein FIG. 8A shows a top view of the installed door safety guard structures with the door in a closed position, FIG. 8B shows a top view of the installed door safety guard structures with the door in a partially open position, and FIG. 8C shows a top view of the installed door safety guard structures with the door in an open position.

DETAILED DESCRIPTION OF A PREFERRED EMBODIMENT

In an embodiment of the present invention, two interconnected elongated members are used to prevent a finger or other object from being inserted into the gaps formed along the hinged edges of an open door and from being pinched or crushed as the door is closed. An elongated member is positioned on each side of the door and rests along a length of the door surface and the adjacent frame. Each elongated member is wide enough so that a portion remains in contact with the door surface and with the adjacent frame when the door is in the open position. The interconnection between the two elongated members is typically elastic and under tension when the two elongated members are in place. Among other things, this holds the two elongated members in place without having to connect either elongated member to either the door or the frame. The elongated members are sufficiently rigid that they do not get pinched or crushed within the gaps as the door is closed, but instead are pushed out of the gaps as the door is closed.

In an exemplary embodiment of the present invention, each elongated member is formed from a plastic material using an extrusion technique, although the present invention is in no way limited to any particular material or to any particular manufacturing technique. For example, the elongated members can also be made from a metal material, a fiberglass material, a composite material, or a wood material, to name but a few.

In an exemplary embodiment of the invention, the two elongated members are interconnected using elastic bands that are attached to each elongated member in such a way that they extend between the two elongated members through the gaps between the door and the frame. In order to facilitate installation of the two elongated members, it is preferable for the elastic bands to be releasable from at least one of the two elongated members so that the two elongated members can be separated and positioned on both sides of the door, at which time the interconnection between the two elongated members is completed. The elastic bands are preferably held in place by one or more dowels or pins (referred to hereinafter as hinges) that fit within a channel formed in each elongated member, although the elastic bands can be held in place by other means. Each hinge preferably has one or more recesses for seating the elastic bands so that, when an elastic band is seated within a recess of the hinge, the hinge still fits within the channel formed in the elongated member. The hinges can typically be separated from the elongated members. This facilitates installation, specifically by allowing an elastic band to be wrapped around a hinge prior to insertion of the hinge into the channel.

In an exemplary embodiment of the invention, an end cap is placed on the bottom of each elongated member. Among other things, the end cap helps to allow the elongated member to slide along the floor, and can also help to hold the hinge(s) in place.

Figure 1A:
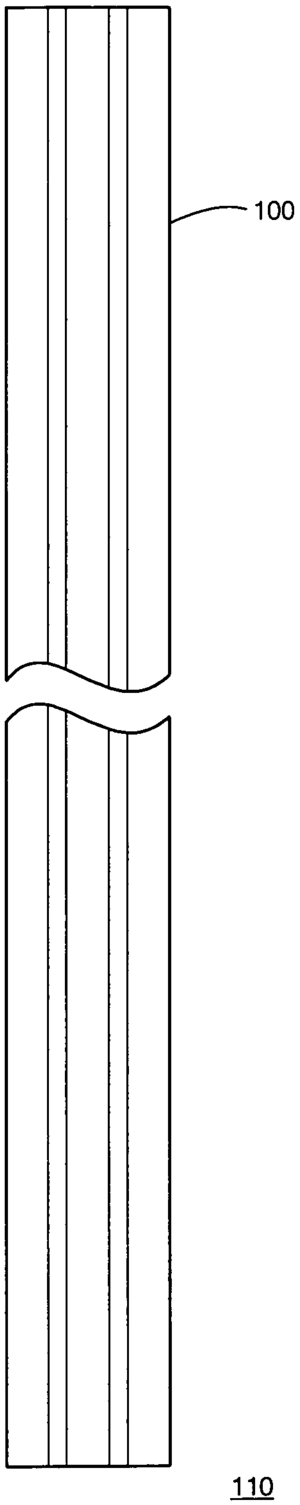
Figure 1B:
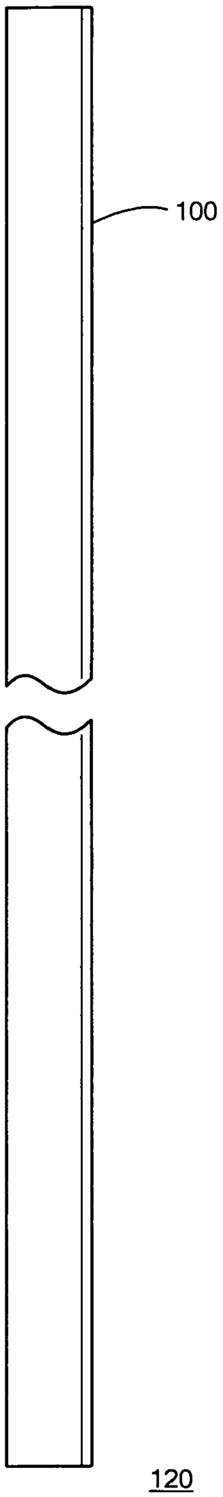
Figure 1C:
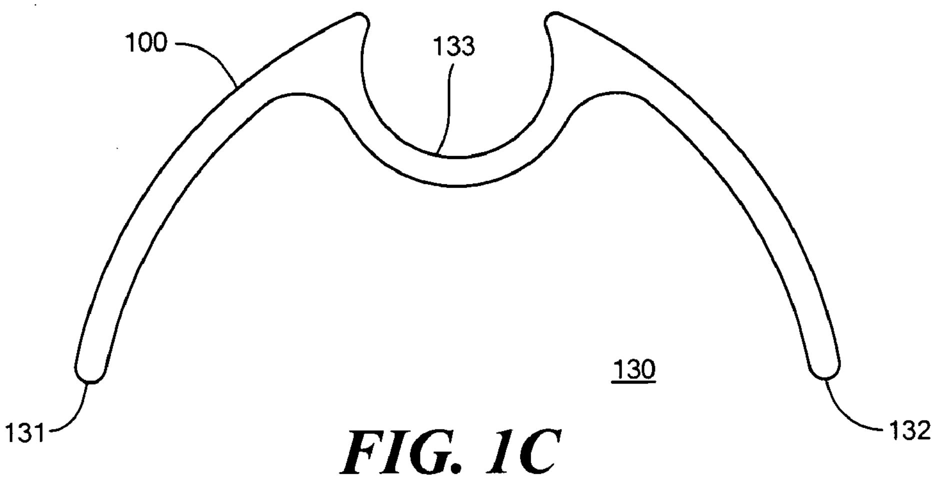
Figure 1D:
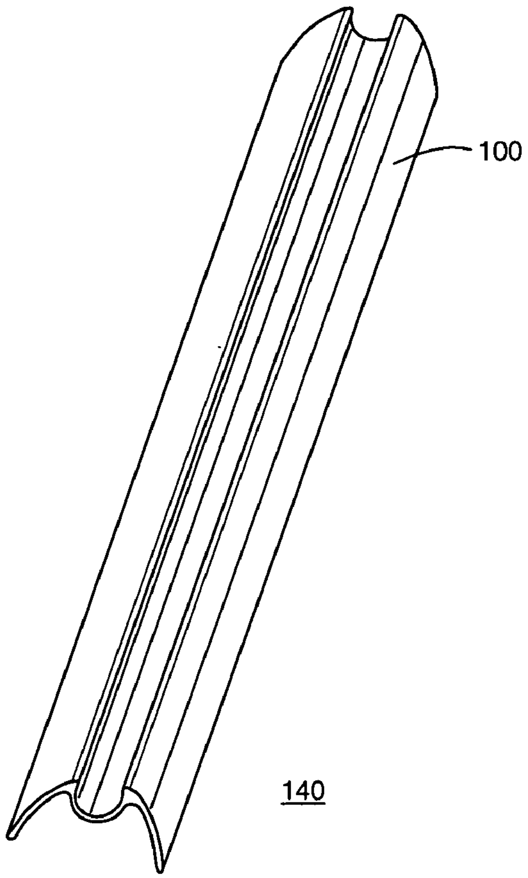

FIGS. 1A–1D show various views of an exemplary elongated member 100 in accordance with an embodiment of the present invention. FIG. 1A shows a front view 110 of the elongated member 100 at approximately 20% actual size. The elongated member 100 is approximately 79.56 millimeters across. FIG. 1B shows a side view 120 of the elongated member 100 at approximately 20% actual size. The elongated member 100 is approximately 38.11 millimeters deep and approximately 1219.2 millimeters long. FIG. 1C shows a top view 130 of the elongated member 100 at approximately actual size. FIG. 1D shows a front perspective view 140 of the elongated member 100 at approximately 20% actual size. The elongated member 100 includes two lateral portions 131 and 132 that make contact with the door and the frame and prevent the elongated member from becoming wedged in the gap. The elongated member 100 also includes a channel 133 for holding the hinge(s). It should be noted that the channel 133 is designed so that the door hinges fit within the channel 133 and so the elongated member 100 can be placed right over the door hinges and still operate to prevent a finger or other object from being caught in the gap.

Figure 2A:
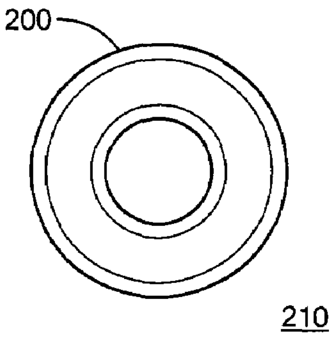
Figure 2B:
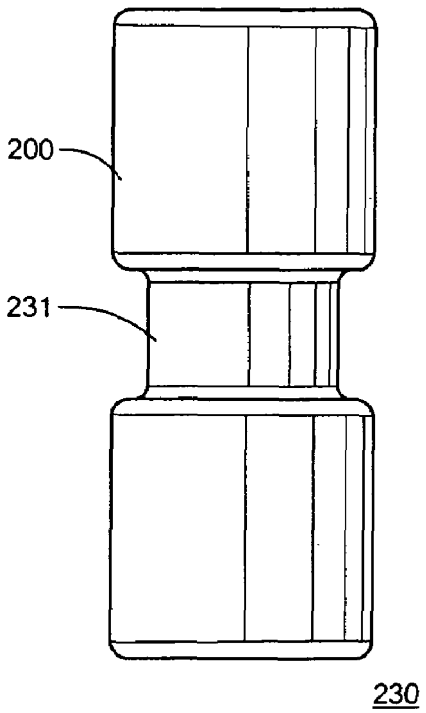
Figure 2C:
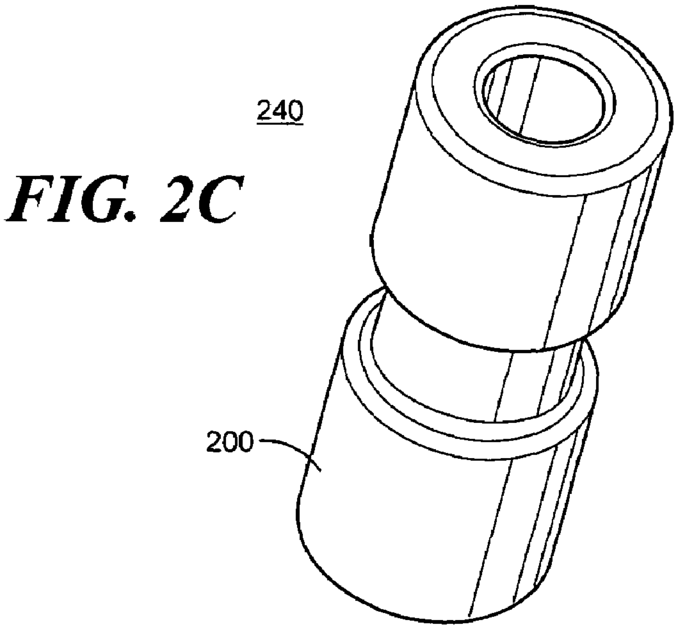

FIGS. 2A–2C show various views of an exemplary hinge 200 in accordance with an embodiment of the present invention. FIG. 2A shows a top view 210 of the hinge 200. FIG. 2B shows a side view 220 of the hinge 200. The hinge 200 is approximately 19.8 millimeters wide and approximately 50 millimeters long. FIG. 2C shows a perspective view 240 of the hinge 200. All views are shown at approximately actual size. The hinge 200 includes a recess 231 for seating an elastic band. The recess 231 is approximately 10 millimeters long and approximately 14.78 millimeters wide, and is centered along the length of the hinge 200.

Figure 3B:
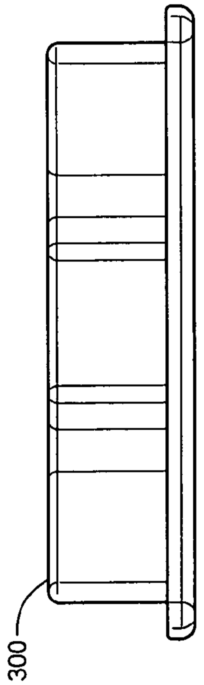
Figure 3D:
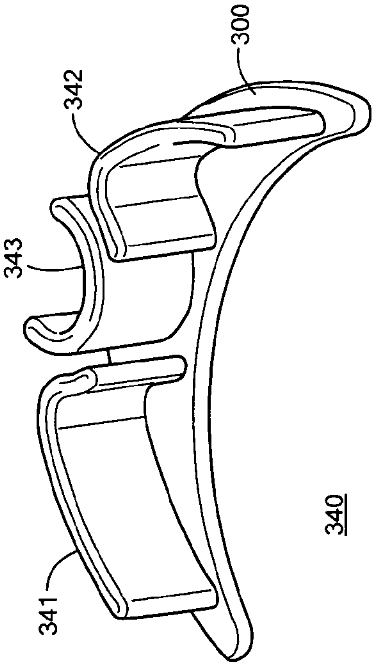
Figure 3A:
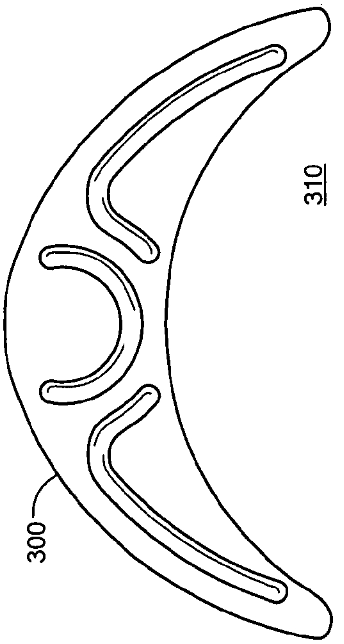
Figure 3C:
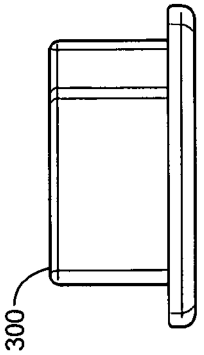

FIGS. 3A–3D show various views of an exemplary end cap 300 in accordance with an embodiment of the present invention. FIG. 3A shows a top view 310 of the end cap 300. FIG. 3B shows a front view 320 of the end cap 300. FIG. 3C shows a side view 330 of the end cap 300. FIG. 3D shows a front perspective view 340 of the end cap 300. The end cap 300 includes two structures 341 and 342 for holding the end cap 300 in the bottom of the elongated member 100. The end cap 300 also includes a structure 343 for securing the hinge 200.

Figure 4:
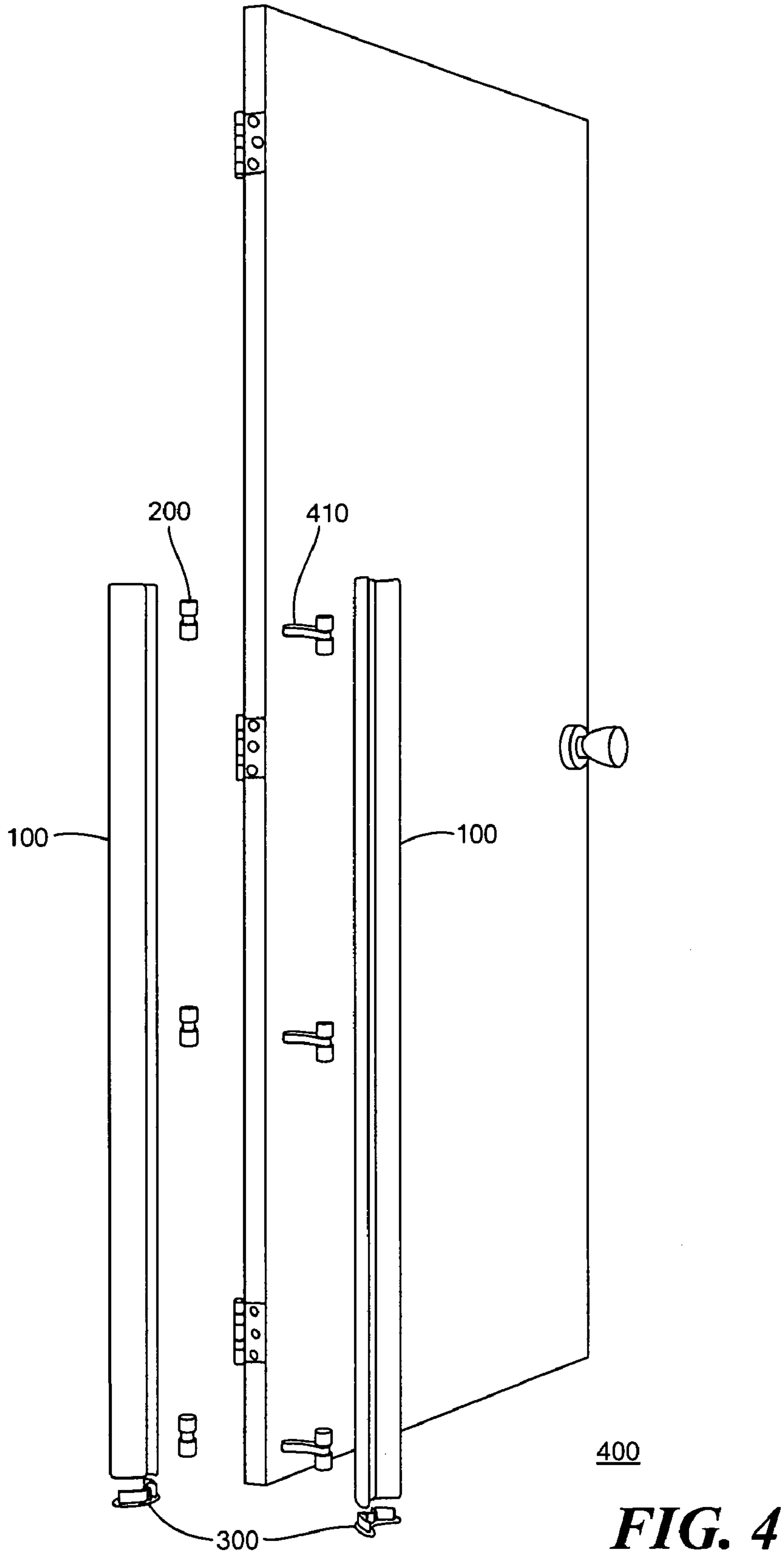
FIG. 4 shows an exploded view of the various door safety guard structures in accordance with an embodiment of the present invention.

FIG. 4 shows an exploded view 400 of the various door safety guard structures including two elongated members (protectors) 100, six hinges 200, two end caps 300, and three elastic bands 410.

Figure 5:
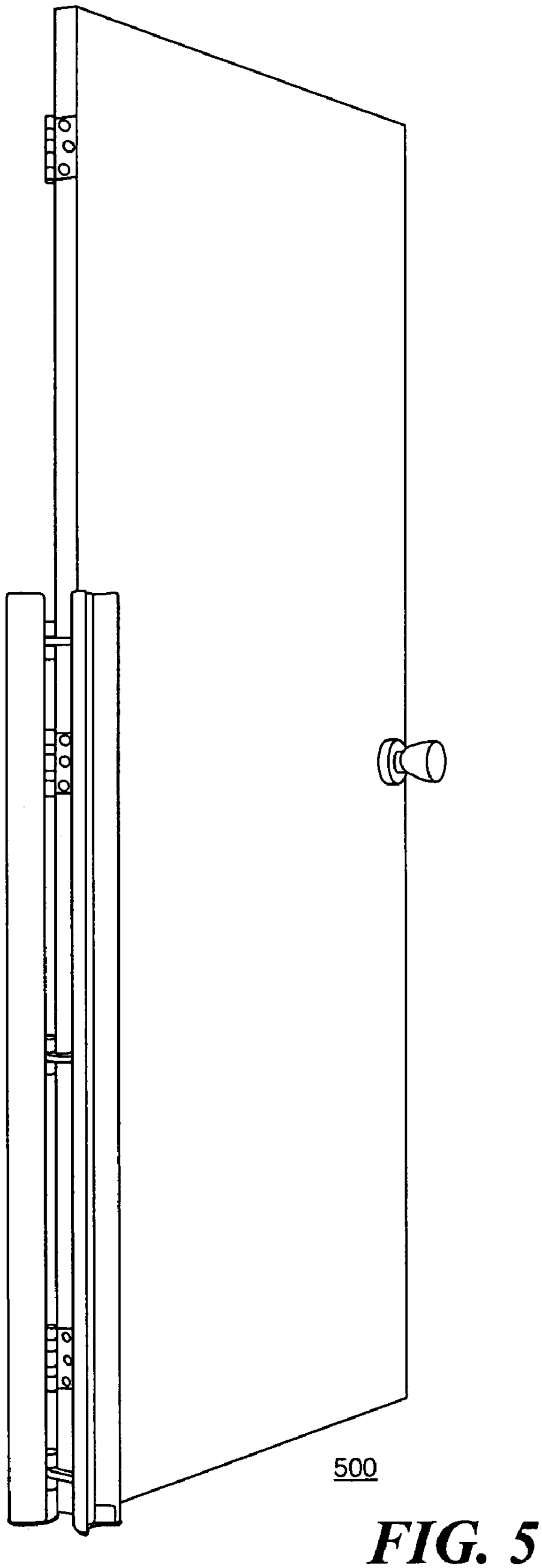
FIG. 5 shows a first perspective view of the installed door safety guard structures in accordance with an embodiment of the present invention.

FIG. 5 shows a first perspective view 500 of the installed door safety guard structures.

Figure 6:
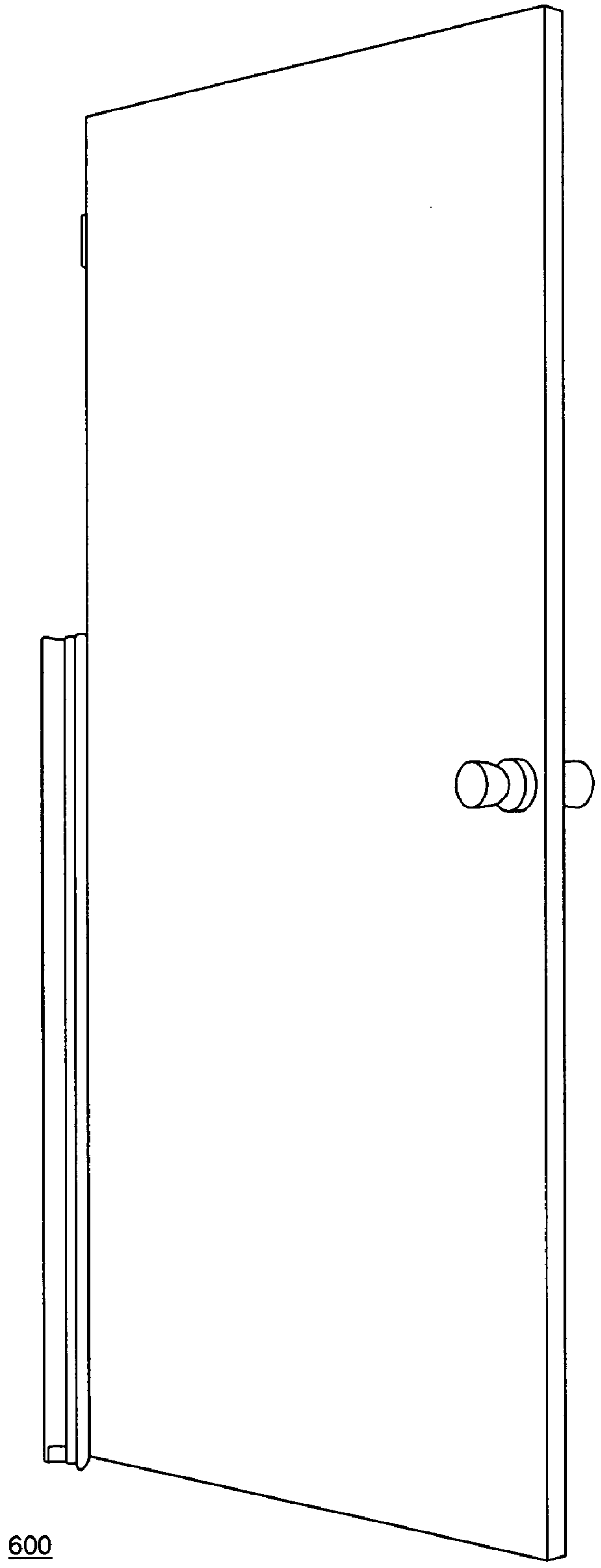
FIG. 6 shows a second perspective view of the installed door safety guard structures in accordance with an embodiment of the present invention.

FIG. 6 shows a second perspective view 600 of the installed door safety guard structures.

Figure 7:
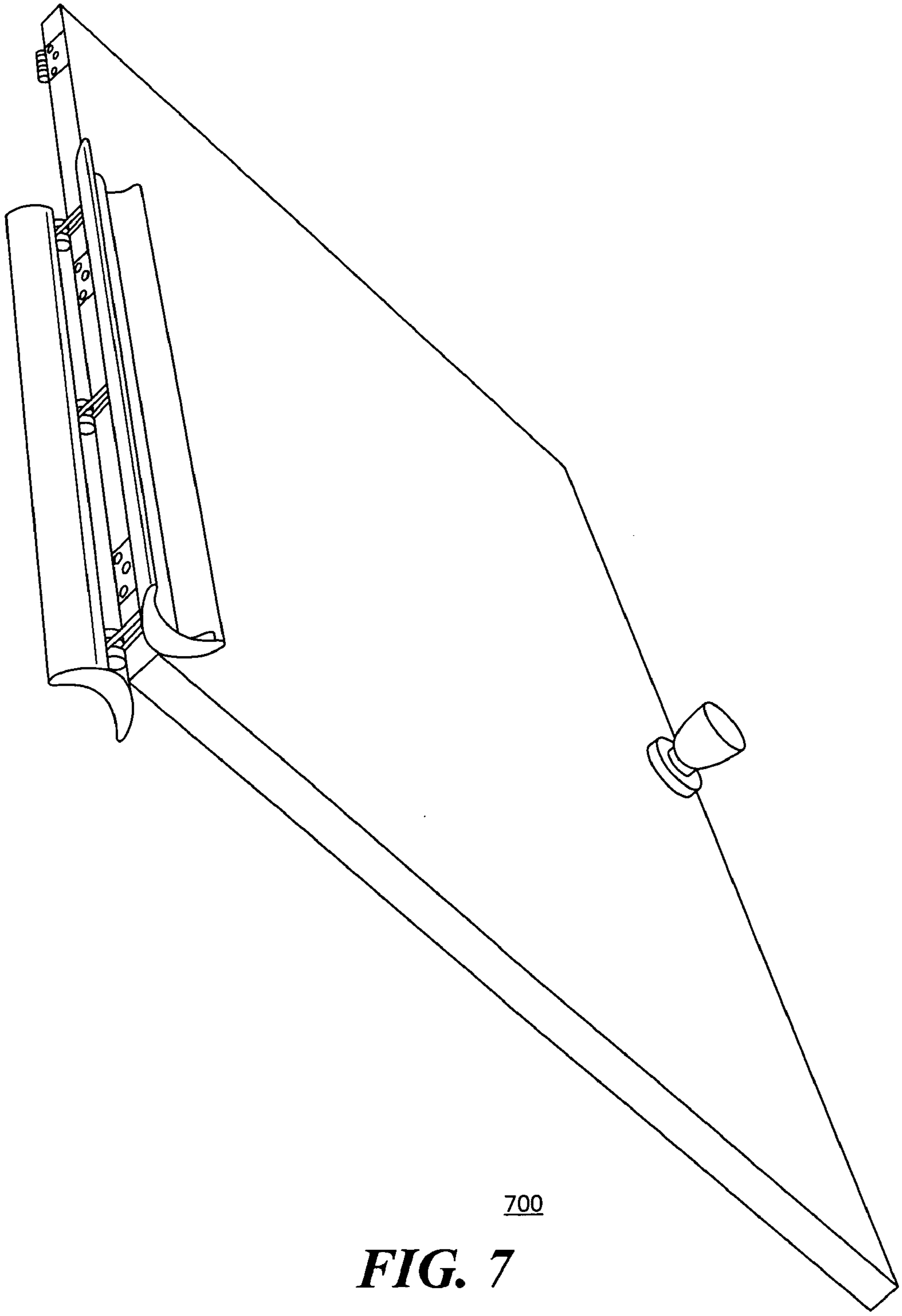
FIG. 7 shows a third perspective view of the installed door safety guard structures in accordance with an embodiment of the present invention.

FIG. 7 shows a third perspective view 700 of the installed door safety guard structures.

Figure 8A:
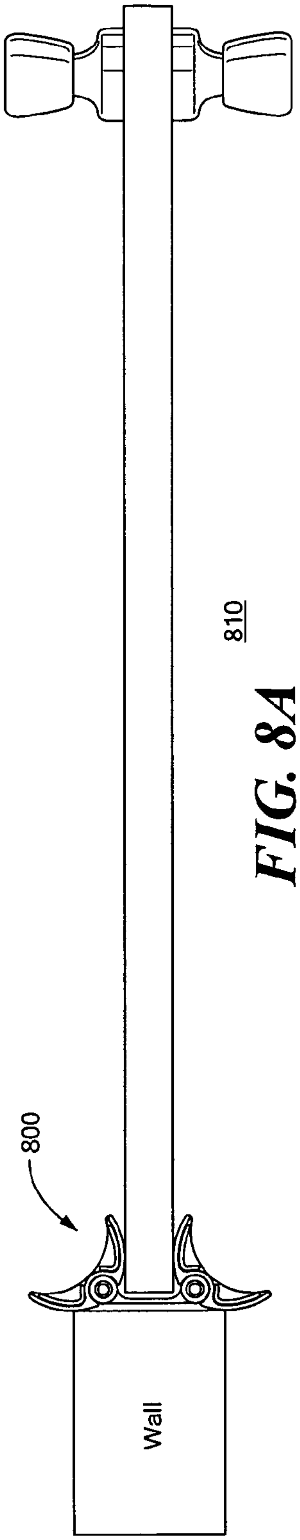
Figure 8B:
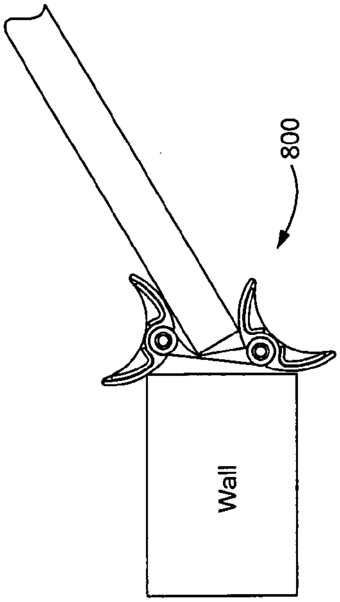
Figure 8C:
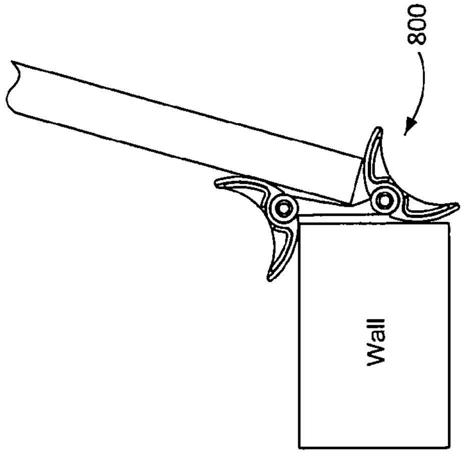

FIGS. 8A–8C show various views of the installed door safety guard structures in accordance with embodiments of the present invention. FIG. 8A shows a top view of the installed door safety guard structures 800 with the door in a closed position 810. FIG. 8B shows a top view of the installed door safety guard structures 800 with the door in a partially open position 820. FIG. 8C shows a top view of the installed door safety guard structures 800 with the door in an open position 830. As shown in FIGS. 8A–8C, the door safety guard structures 800 move along with the door to fill the gap in any position.

The elongated members are shown in the figures as extending just over half way up the height of the door. This might be useful, for example, for protecting young children and pets from injury. However, the elongated members can be longer or shorter, and can be made to extend the full height of the door. The elongated members can also be cut to size for a particular application, or multiple elongated member lengths can be stacked to increase the amount of protection. For example, as shown in FIG. 1, the elongated members can be provided in 48 inch (1219.2 mm) lengths, and two elongated members (one cut down to 36 inches) can be stacked to protect one side of an 84 inch high door.

As discussed above, the elongated members can be made from any of a variety of materials using any of a variety of techniques. For example, a prototype was made using a block of wood. The prototype was shaped substantially as in the top view 130, but was solid between the two lateral portions 131 and 132 (actually, the prototype was slightly convex between the two lateral portions 131 and 132 rather than being concave as shown in the top view 130 or even straight across, although the shape of this portion of the elongated member has no real bearing on the performance of the elongated member since this portion does not contact either the door or the frame). Different materials have different advantages and disadvantages. For example, a plastic material is lightweight, easy to produce using an extrusion technique, and inexpensive, but may be subject to some bending or flexing. A metal material is generally more rigid than plastic, but is more expensive. Although most materials can be painted to match the door and/or frame, a wood material can be stained to match the door and/or the frame.

It should be noted that the elongated members are in no way limited to the specific shape shown in FIG. 1. Rather, elongated members of various sizes, shapes, and thicknesses can be formed to function substantially as described herein. Exemplary elongated member shapes may include rounded, ovate, wedge, or trapezoidal shapes, to name but a few. All such elongated members are intended to fall within the scope of the present invention and the following claims.

It should also be noted means other than hinges can be used to hold the couple the elastic bands to the elongated members. For example, the elongated members can include integral structures, such as hooks, spurs, or cleats, at various points along their lengths around which the elastic band can be wound. If hinges are used, then the hinges are in no way limited to the specific shape shown in FIG. 2.

The present invention may be embodied in other specific forms without departing from the true scope of the invention. The described embodiments are to be considered in all respects only as illustrative and not restrictive.

What is claimed is:

1. A door safety guard comprising:

an elongated member having two lateral portions for respectively contacting a surface of a door and a surface of an adjacent door frame, the elongated member capable of being interconnected with another elongated member such that one elongated member is positioned on each side of the door and rests along a length of the door surface and the adjacent door frame surface so as to substantially cover gaps formed between the door and the adjacent door frame when the door is in an opened position and prevent a finger or other object from being pinched or crushed when the door is closed, wherein the elongated member is held in position through interconnection with the other elongated member.

2. The door safety guard of claim 1, wherein the elongated member is comprised of a unitary rigid piece of material.

3. The door safety guard of claim 2, wherein the material comprises one of:

a plastic material;
a metal material;
a fiberglass material;
a composite material; and
a wood material.

4. The door safety guard of claim 2, wherein the unitary rigid piece of material is fabricated using an extrusion process.

5. The door safety guard of claim 1, wherein the elongated member further comprises:

a channel portion located between the two lateral portions for holding a separate hinge apparatus used to interconnect the two elongated members.

6. A door safety guard comprising:

at least two elongated members, each having two lateral portions for respectively contacting a surface of a door and a surface of an adjacent door frame; and at least one connector for interconnecting the elongated members such that an elongated member is positioned on each side of the door and rests along a length of the door surface and the adjacent door frame surface so as to substantially cover gaps formed between the door and the adjacent door frame when the door is in an opened position and prevent a finger or other object from being pinched or crushed when the door is closed.

7. The door safety guard of claim 6, wherein each elongated member is comprised of a unitary rigid piece of material.

8. The door safety guard of claim 7, wherein the material comprises one of:

a plastic material;
a metal material;
a fiberglass material;
a composite material; and
a wood material.

9. The door safety guard of claim 7, wherein the unitary rigid piece of material is fabricated using an extrusion process.

10. The door safety guard of claim 6, further comprising:

a number of hinges for securing the at least one connector to the elongated members.

11. The door safety guard of claim 10, wherein each elongated member comprises a channel portion located between the two lateral portions, and wherein the hinges fit securely within the channel portion.

12. The door safety guard of claim 10, wherein each hinge comprises a recessed portion for seating a connector.

13. The door safety guard of claim 6, wherein a plurality of elongated members are capable of being stacked on each side of the door to cover a selectable portion of the gaps.

14. The door safety guard of claim 6, further comprising:

a number of end caps, each end cap connectable to an end of an elongated member.

* * * * *